No. 813,423. PATENTED FEB. 27, 1906.
H. HILL.
MECHANISM FOR CONNECTING VEHICLE WHEELS TO AXLES.
APPLICATION FILED AUG. 7, 1905.

Witnesses:
Ira D. Perry
J. B. Weir

Inventor:
Hugh Hill
By Cheever & Cox
Attys

UNITED STATES PATENT OFFICE.

HUGH HILL, OF ANDERSON, INDIANA, ASSIGNOR TO HILL STANDARD MANUFACTURING COMPANY, OF ANDERSON, INDIANA, A CORPORATION OF INDIANA.

MECHANISM FOR CONNECTING VEHICLE-WHEELS TO AXLES.

No. 813,423.           Specification of Letters Patent.           Patented Feb. 27, 1906.

Original application filed March 20, 1905, Serial No. 251,045. Divided and this application filed August 7, 1905. Serial No. 273,044.

*To all whom it may concern:*

Be it known that I, HUGH HILL, a citizen of the United States, residing at Anderson, in the county of Madison and State of Indiana, have invented a certain new and useful Improvement in Mechanism for Connecting Vehicle-Wheels to Axles, of which the following is a specification.

My invention relates to mechanism for connecting the wheel of a vehicle to the axle, and particularly in mechanism for connecting a wheel having wire spokes to the axle of a child's vehicle.

It is a division of my prior application for self-propelled vehicles, Serial No. 251,045, filed by me March 20, 1905.

The object of my invention is to provide mechanism for fastening such a wheel to the axle so that it will be rigidly secured thereto and the strain will be evenly distributed upon both sides of the wheel.

It consists in the use of a clip rigidly secured to the axis having fingers bent over the hub of the wheel and between the spokes rising from said hub.

It also consists in details of construction, which will be hereinafter more fully described and claimed.

Figure 1:
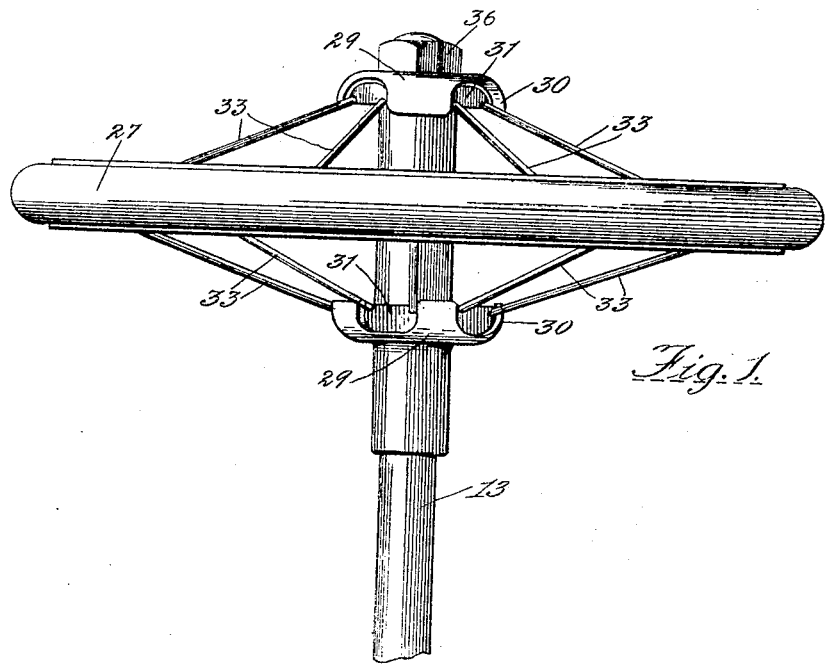
Figure 2:
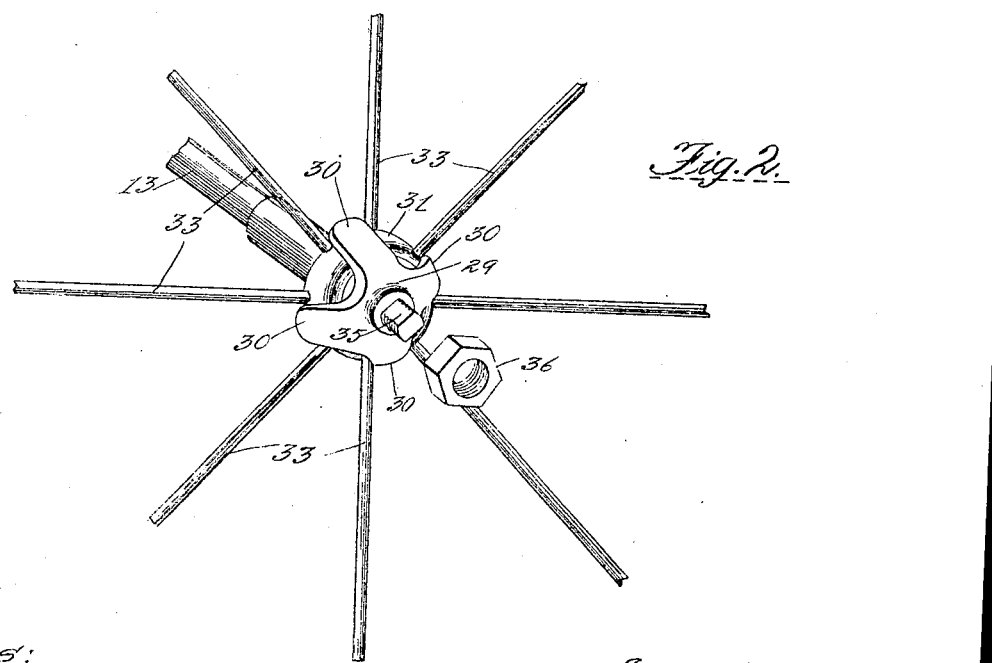

In the drawings, Figure 1 is a plan view of an axle having a wheel applied thereto by the mechanism of my invention. Fig. 2 is a detail perspective view showing the mechanism of my invention.

As stated in the above-mentioned original application, it is customary in a child's cart to secure only one rear or traction wheel to the axle, and as all the power has to be transmitted through this wheel it is necessary to rigidly secure the wheel to the axle. In order to accomplish this, the wheel 27 is secured to the shaft or axle 13 by means of claw-shaped clips 29, one of them being shown in detail in Fig. 2. As shown, each clip has several fingers 30, which fit over the hub 31 of the wheel and pass between the spokes 33. The clips 29 are adapted to fit over non-circular portions 35 of the axle and be secured in position by the nuts 36, thereby insuring their non-rotatability upon the axle. The clips 29 being thus securely held in position upon the axle and the fingers 30 extending between the spokes of the wheel, as heretofore described, and, as shown, occupying substantially all of the space between the spokes, it will readily be seen that the clips hold the hub of the wheel securely upon the axle 13. In order to prevent the driving strain used in propelling the cart being transmitted to only one side of or one set of spokes of the wheel 27, I provide clips 29 upon both sides of the wheel 27, as shown in Fig. 1, thereby securing both sides of the wheel upon the axle 13 and doing away with any irregular strain, such as just described, where only one clip is used. The method of fastening the inner clip (the lower one in Fig. 1) is not shown in detail; but the method shown in Fig. 2 or any other suitable means may be used for fastening this clip in rigid position upon the shaft 13.

Having thus described my invention, what I claim as new, and desire to secure by Letters Patent, is—

1. In mechanism of the class described the combination of an axle, a traction-wheel mounted thereon, claw-shaped clips rigidly secured upon the axle, having their claws or fingers over the outsides of hubs of the wheel and between the spokes thereof, for the purpose of rigidly securing the wheel to the axle substantially as described.

2. In a child's vehicle the combination of an axle, a wire-spoked traction-wheel mounted thereon, claw-shaped clips 29 rigidly secured to the axle on opposite sides of the wheel the claws or fingers of the clips being folded over the hubs of the wheel and passing between the spokes to secure the wheel in rigid position upon the axle substantially as described.

3. In a child's vehicle the combination of an axle, a wire-spoked traction-wheel mounted thereon, claw-shaped clips 29 rigidly secured to the axle on opposite sides of the wheel, the claws or fingers of the clips being folded over the hubs of the wheel and passing between the spokes of the wheel the width of said fingers or clips being substantially the width of the spaces between successive spokes whereby the clips are adapted to secure the wheel in rigid position upon the axle substantially as described.

4. In mechanism of the class described, the combination of an axle a traction-wheel mounted thereon, a claw-shaped clip rigidly secured upon the axle having its claws or fingers over the outside of the hub of the wheel and extending between the spokes thereof.

5. As an article of manufacture for use in mechanism of the class described a clip 29 adapted to be secured to the axle having one or more fingers 30 of the form shown adapted to fit over the outside of the wheel-hub and pass between the spokes thereof.

6. In mechanism of the class described, the combination of an axle a traction-wheel mounted thereon a claw-shaped clip rigidly secured upon the axle having its claws or fingers bearing against the axle of the wheel fitting between the spokes of the wheel and occupying substantially the width of the spaces between the spokes whereby said clip is adapted to secure the wheel in rigid position upon the axle.

In witness whereof I have hereunto subscribed my name in the presence of two witnesses.

HUGH HILL.

Witnesses:
ANNA E. MILLER,
MARCELLUS A. CHIPMAN.